(12) United States Patent
Roh et al.

(10) Patent No.: US 8,497,881 B2
(45) Date of Patent: Jul. 30, 2013

(54) IMAGE PROCESSORS, ELECTRONIC DEVICE INCLUDING THE SAME, AND IMAGE PROCESSING METHODS

(75) Inventors: Jong Ho Roh, Yongin-si (KR); Sung-Jin Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 693 days.

(21) Appl. No.: 12/713,397

(22) Filed: Feb. 26, 2010

(65) Prior Publication Data

US 2010/0220105 A1 Sep. 2, 2010

(30) Foreign Application Priority Data

Mar. 2, 2009 (KR) .................. 10-2009-0017673

(51) Int. Cl.
*G09G 5/00* (2006.01)

(52) U.S. Cl.
USPC ........... 345/660; 345/629; 345/619; 382/298; 348/553; 348/563

(58) Field of Classification Search
USPC ....................................................... 345/660
See application file for complete search history.

(56) References Cited

U.S. PATENT DOCUMENTS

| | | | | |
|---|---|---|---|---|
| 5,068,905 A | * | 11/1991 | Hackett et al. | 382/299 |
| 5,489,952 A | * | 2/1996 | Gove et al. | 348/771 |
| 6,275,234 B1 | * | 8/2001 | Iwaki | 345/428 |
| 6,493,036 B1 | * | 12/2002 | Fernandez | 348/561 |
| 6,828,987 B2 | * | 12/2004 | Swan | 345/660 |
| 6,999,105 B2 | * | 2/2006 | Buerkle et al. | 345/660 |
| 7,050,113 B2 | * | 5/2006 | Campisano et al. | 348/581 |
| 7,911,536 B2 | * | 3/2011 | Dunton | 348/556 |
| 8,170,095 B2 | * | 5/2012 | Roman | 375/240 |
| 2006/0077213 A1 | * | 4/2006 | Li | 345/660 |
| 2007/0030276 A1 | * | 2/2007 | MacInnis et al. | 345/505 |
| 2007/0041662 A1 | * | 2/2007 | Jeffrey | 382/298 |
| 2008/0062304 A1 | * | 3/2008 | Villeneuve et al. | 348/387.1 |
| 2008/0107174 A1 | * | 5/2008 | Roman | 375/240.02 |
| 2009/0003730 A1 | * | 1/2009 | Pande et al. | 382/298 |
| 2009/0256862 A1 | * | 10/2009 | Rassel et al. | 345/660 |
| 2009/0256863 A1 | * | 10/2009 | Komorowski et al. | 345/660 |
| 2010/0110106 A1 | * | 5/2010 | MacInnis et al. | 345/629 |
| 2010/0111195 A1 | * | 5/2010 | Fortin | 375/240.26 |

FOREIGN PATENT DOCUMENTS

| | | |
|---|---|---|
| JP | 09-275563 | 10/1997 |
| JP | 2004-118018 | 4/2004 |
| KR | 1020020012653 A | 2/2002 |
| KR | 1020020089997 A | 11/2002 |

* cited by examiner

*Primary Examiner* — M Good Johnson
(74) *Attorney, Agent, or Firm* — Myers Bigel Sibley & Sajovec

(57) ABSTRACT

An image processor for combining video data and graphic data is provided. The image processor includes a scaler that is configured to scale compressed graphic data in a horizontal direction using bilinear scaling, to scale a horizontally scaled graphic data in a vertical direction using line copy, and to process a data value of a pixel at a border of a vertically scaled graphic data based on a data value of the compressed graphic data and a data combiner that is configured to combine video data with processed graphic data output from the scaler.

17 Claims, 10 Drawing Sheets

FIG. 4B

| ⋮ | ⋮ |
|---|---|
| B | B |
| B1 | B |
| A | A |
| A1 | A |
| ⋮ | ⋮ |

FIG. 4C

| ⋮ | ⋮ |
| B | B |
| B ← | B |
| A | A |
| A1 | A |
| ⋮ | ⋮ |

FIG. 5B

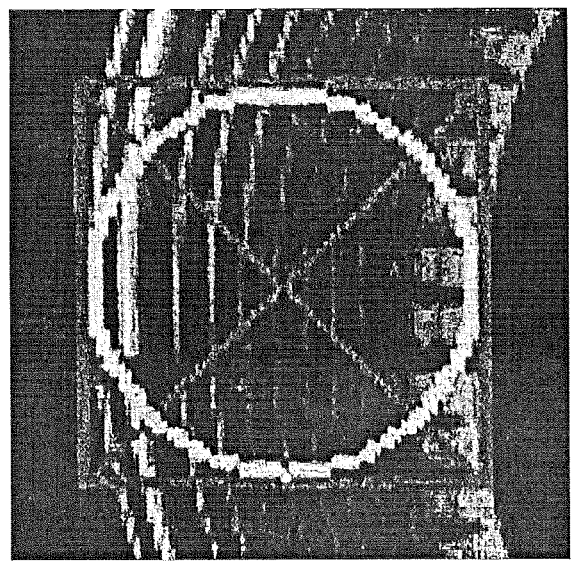
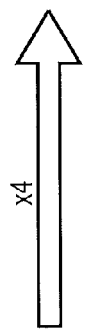
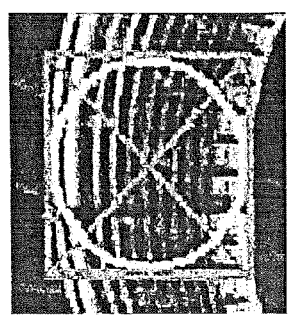
FIG. 6

IMAGE PROCESSORS, ELECTRONIC DEVICE INCLUDING THE SAME, AND IMAGE PROCESSING METHODS

RELATED APPLICATIONS

This application claims priority under 35 U.S.C. §119 to Korean Patent Application No. 10-2009-0017673 filed on Mar. 2, 2009, in the Korean Intellectual Property Office, the disclosure of which is incorporated herein by reference as if set forth fully herein.

BACKGROUND

Embodiments of the present invention relate to image processing technology.

Electronic devices including a display unit display video data together with graphic data for UI including on-screen display (OSD) data. OSD may provide information on the video data or show whether functions are executed in response to a user's operation. Users may be sensitive to the quality of video data displayed on a screen but may not be sensitive to the quality of graphic data. Accordingly, when the graphic data is compressed to be stored in a memory and decompressed to be displayed on the screen, the bandwidth of the memory that stores and outputs the graphic data may be reduced.

When graphic data is compressed using a conventional method such as a video coding layer (VCL), it may be difficult to realize lossless compression and maintain a compression ratio constant. Moreover, combining UI and video data using chroma key may not be carried out by conventional scalers.

SUMMARY

Some embodiments of the present invention include an image processor that includes a scaler that is configured to scale compressed' graphic data in a horizontal direction using bilinear scaling, to scale a horizontally scaled graphic data in a vertical direction using line copy, and to process a data value of a pixel at a border of a vertically scaled graphic data based on a data value of the compressed graphic data. The image processor may include a data combiner that is configured to combine video data with processed graphic data output from the scaler.

In some embodiments, the scaler includes a horizontal scaler that is configured to scale the compressed graphic data in the horizontal direction using the bilinear scaling and a vertical scaler that is configured to scale the horizontally scaled graphic data in the vertical direction using the line copy. A data processor may be included that is configured to set the data value of the pixel at the border of the vertically scaled graphic data to a graphic data value of a pixel adjacent to the pixel at the border in the graphic data.

Some embodiments provide that the horizontal scaler is further configured to scale a coefficient used to combine the video data with the graphic data using the bilinear scaling. In some embodiments, the horizontal scaler is configured to scale an alpha value area used to combine the video data with the graphic data using the bilinear scaling. Some embodiments provide that the horizontal scaler is configured to scale a chroma key area used to combine the video data with the graphic data using the bilinear scaling.

Some embodiments of the present invention include an electronic device that includes an image processor as described herein and a memory that is configured to store the compressed graphic data and the video data and to output the compressed graphic data and the video data to the image processor. The electronic device may include a display unit that is configured to display image data output from the image processor.

Some embodiments of the present invention include image processing methods that include scaling compressed graphic data in a horizontal direction using bilinear scaling and scaling a horizontally scaled graphic data in a vertical direction using line copy. Such embodiments may further include processing a data value of a pixel at a border of a vertically scaled graphic data based on a data value of the compressed graphic data and combining video data with processed graphic data.

Some embodiments provide that processing the data value of the pixel includes setting the data value of the pixel at the border of the vertically scaled graphic data to a graphic data value of a pixel adjacent to the pixel at the border in the graphic data. In some embodiments, scaling the compressed graphic data in the horizontal direction includes scaling an alpha value area used to combine the video data with the graphic data using the bilinear scaling. Some embodiments provide that scaling the compressed graphic data in the horizontal direction includes scaling a chroma key area used to combine the video data with the graphic data using the bilinear scaling.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

FIG. 4B is a diagram of graphic data scaled to two times in a horizontal direction according to some embodiments of the present invention.

FIG. 4C is a diagram showing that the data value of a pixel at a border of graphic data scaled to two times in the horizontal direction is processed to be the same as the data value of its adjacent pixel.

FIG. 5B is a diagram showing that the data value of a pixel at a border of graphic data scaled to four times in the horizontal direction is processed to be the same as the data value of its adjacent pixel.

FIG. 6 is a diagram showing compressed graphic data and 4-times scaled-up graphic data.

DETAILED DESCRIPTION

Figure 1:
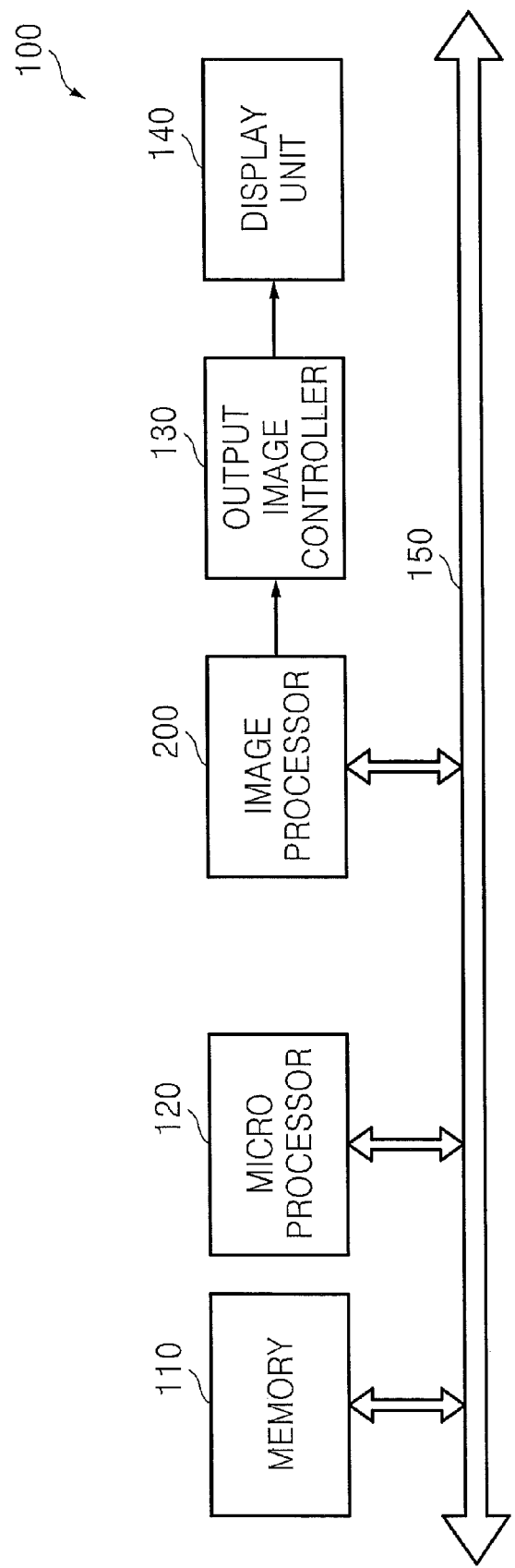
FIG. 1 is a block diagram of an electronic device according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The teen "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation of claimed inventions is provided.

Reference numerals are indicated in detail in some embodiments of the present invention, and their examples are represented in reference drawings. Throughout the drawings, like reference numerals are used for referring to the same or similar elements in the description and drawings.

Reference is now made to FIG. 1, which is a block diagram of an electronic device 100 according to some embodiments of the present invention. Some embodiments provide that the electronic device 100 includes a memory 110, a microprocessor 120, an image processor 200, an output image controller 130, a display unit 140, and a system bus 150.

The memory 110 may store video data and/or graphic data. The graphic data may be generated, compressed, and/or stored in the memory 110 when the electronic device 100 is manufactured. In some embodiments, the video data and/or the graphic data may be in an RGB format, in which a color image is represented with red (R), green (G) and blue (B) components, or in a YUV format, in which a color image is represented with a single luminance component and two color components. However, the present invention is not restricted thereto. The RGB format may be RGB888, ARGB8888, and/or RGB666 and the YUV format may be YCbCr420 and/or YCbCr422.

The microprocessor 120 may control the operation of each element of the electronic device 100. The elements of the electronic device 100 may be connected to each other through the system bus 150. The image processor 200 may scale up graphic data output from the memory 110, combine the graphic data with video data, and output combined data in real time.

The output image controller 130 outputs the combined data from the image processor 200 to the display unit 140. The output image controller 130 may be implemented by a data driving circuit. The display unit 140 displays the combined data output from the output image controller 130.

The electronic device 100 may be a personal computer (PC), a portable computer, a digital camera, a personal digital assistant (PDA), a cellular telephone, an MP3 player, a portable multimedia player (PMP), and/or an automotive navigation system, among others, which can display video data.

Figure 2:
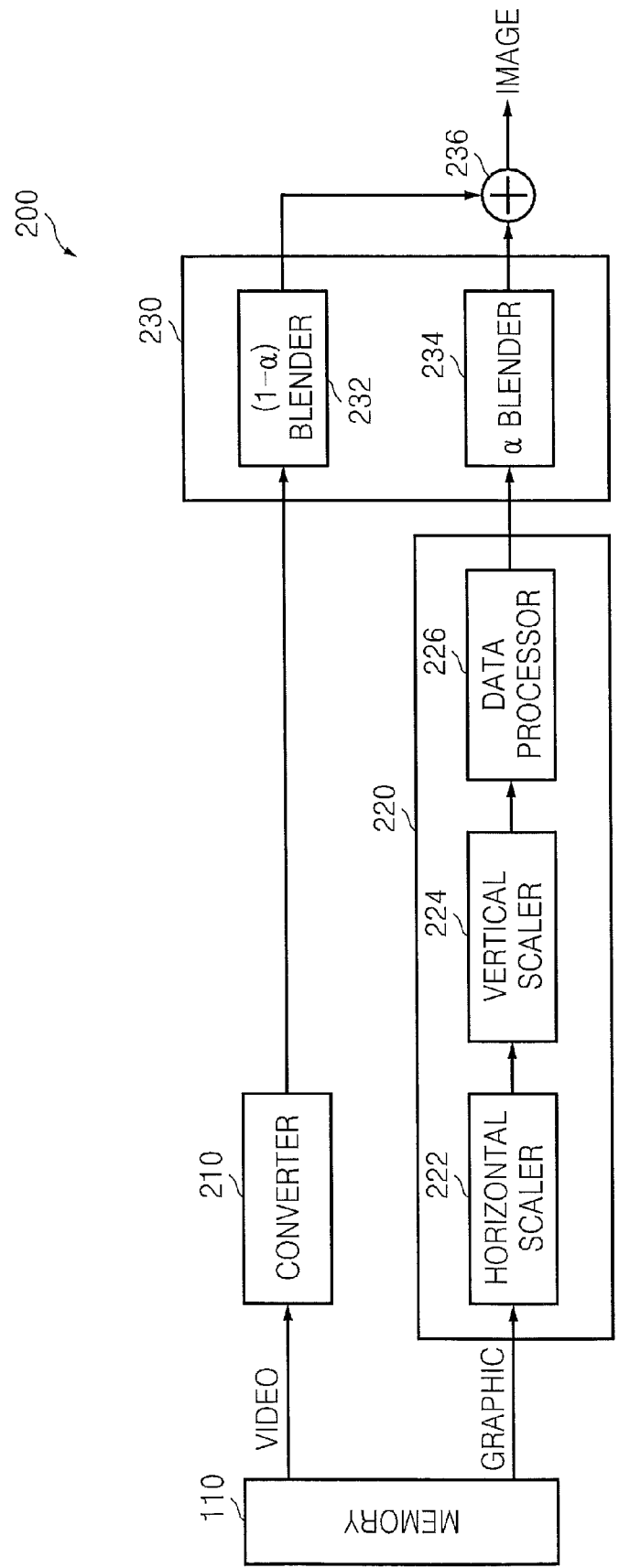
FIG. 2 is a block diagram of an image processor according to some embodiments of the present invention.

Reference is now made to FIG. 2, which is a block diagram of the image processor 200 shown in FIG. 1. Some embodiments provide that the image processor 200 may include a converter 210, a scaler 220, and a data combiner 230.

The converter 210 converts video data VIDEO output from the memory 110 into a format of graphic data GRAPHIC output from the memory 110. For instance, when the data combiner 230 alpha blends the graphic data GRAPHIC in the RGB format with the video data VIDEO, the converter 210 converts the video data VIDEO from the YUV format to the RGB format.

The scaler 220 includes a horizontal scaler 222, a vertical scaler 224 and a data processor 226. In some embodiments, the horizontal scaler 222 scales the compressed graphic data GRAPHIC in a horizontal direction using bilinear scaling. The bilinear scaling may be a process of setting the arithmetic mean of data values of two adjacent pixels as a data value of a pixel to be positioned between the two adjacent pixels.

Some embodiments provide that the horizontal scaler 222 scales a coefficient used to combine the video data VIDEO with the graphic data GRAPHIC using bilinear scaling. In some embodiments, when the video data VIDEO is combined with the graphic data GRAPHIC using alpha blending, the horizontal scaler 222 may scale the data value area and the alpha value area of the graphic data GRAPHIC at one time. Some embodiments provide that when the video data VIDEO is combined with the graphic data GRAPHIC using chroma key, the horizontal scaler 222 may scale a chroma key area using the bilinear scaling. The vertical scaler 224 may scale the graphic data GRAPHIC that has been scaled in the horizontal direction in a vertical direction using line copy.

The data processor 226 processes the data value of a pixel at a border of the scaled graphic data GRAPHIC based on a compressed graphic data value. This operation may be performed to prevent the border between an area in which the graphic data GRAPHIC is displayed and an area in which the video data VIDEO is displayed from being vague due to the bilinear scaling. For instance, the data processor 226 may set the data value of a pixel at a border of the vertically scaled graphic data GRAPHIC to the graphic data value of a pixel adjacent to the pixel at the border.

The data combiner 230 combines the video data VIDEO with the scaled graphic data GRAPHIC output from the scaler 220. Some embodiments provide that the data combiner 230 may combine the video data VIDEO with the graphic data GRAPHIC using alpha blending, however, embodiments of the present invention are not so limited.

The data combiner 230 includes an alpha blender 234, a (1−α) blender 232, and an adder 236. The alpha blender 234 multiplies the graphic data GRAPHIC in the RGB format by alpha. The (1−α) blender 232 multiplies the video data VIDEO by (1−α). The adder 236 sums output data of the alpha blender 234 and output data of the (1−α) blender 232.

The image processor 200 may also include a converter (not shown) which converts the format of combined data output from the data combiner 230. The converter may convert the combined data from the YUV format to the RGB format and/or from the RGB format to the YUV format.

Figure 3:
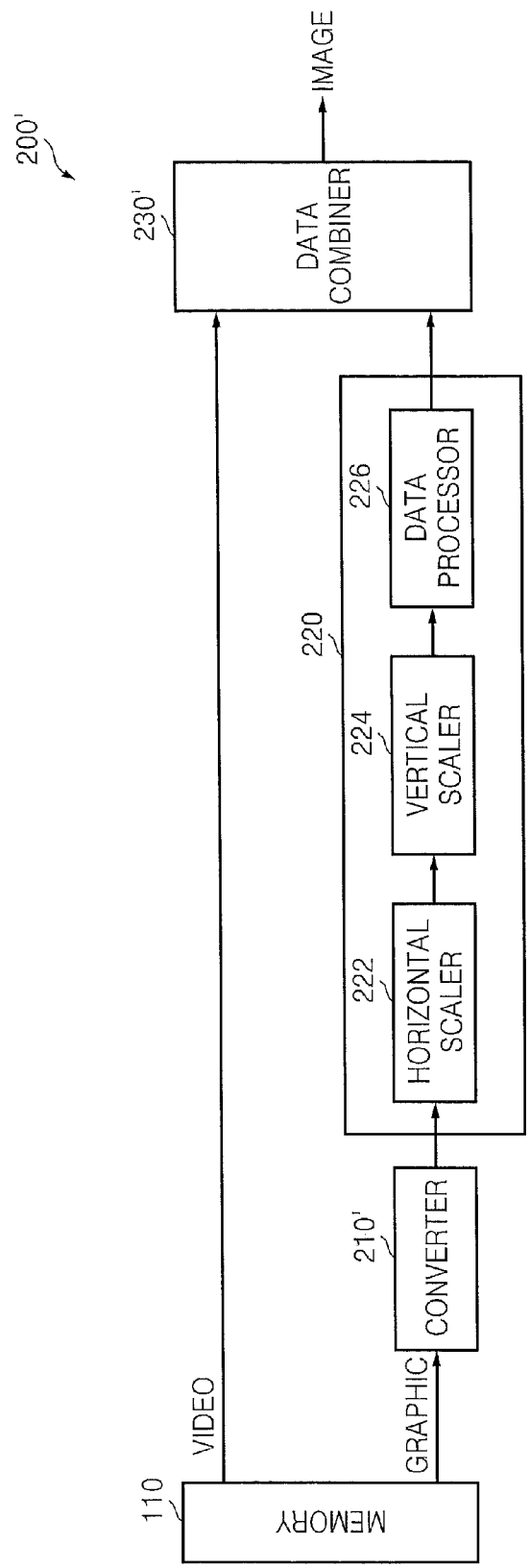
FIG. 3 is a block diagram of an image processor according to some embodiments of the present invention.

Reference is now made to FIG. 3, which is a block diagram of an image processor 200' according to some embodiments of the present invention. The image processor 200' may include similar elements as the image processor 200 illustrated in FIG. 2 and discussed above except for a converter 210' and a data combiner 230'. In this regard, discussions regarding FIG. 3 will describe differences between the image processors 200' and 200.

Some embodiments provide that the converter 210' converts the format of the graphic data GRAPHIC to the format of the video data VIDEO. If the format of the graphic data GRAPHIC is the same as that of the video data VIDEO, the converter 210' may be unnecessary.

The data combiner 230 illustrated in FIG. 2 may combine the video data VIDEO with the graphic data GRAPHIC using alpha blending. A data combining scheme used by the data combiner 230' may include combining operations instead of or in addition to alpha blending. For example, in some embodiments, the data combiner 230' may combine the video data VIDEO with the graphic data GRAPHIC using chroma key.

The image processor 200 or 200' and/or the scaler 220 according to some embodiments of the present invention may be packed in various types of packages. For example, the various packages may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and/or Wafer-Level Processed Stack Package (WSP), among others.

Each element of the image processor 200 or 200' may be implemented in software, hardware, or combination thereof. In other words, each element of the image processor 200 or 200' may be implemented by a logical combination of predetermined codes and/or hardware resources where the predetermined codes are executed.

Figure 4A:
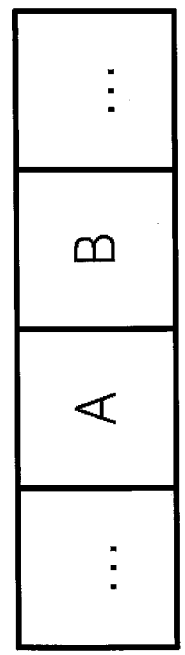
FIG. 4A is a diagram of compressed graphic data according to some embodiments of the present invention.
Figure 4B:
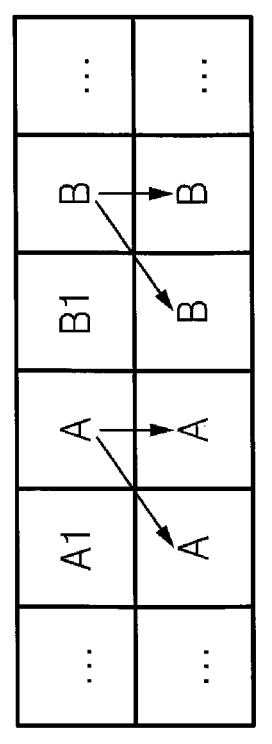

FIG. 4A is a diagram of compressed graphic data. FIG. 4B is a diagram of graphic data scaled to two times in the horizontal direction. A procedure of scaling graphic data according to some embodiments will be described with reference to FIGS. 2 through 4B below.

The horizontal scaler 222 generates a data value A1 based on the arithmetic mean of the data value of a pixel A illustrated in FIG. 4A and the data value of a pixel on the left hand of the pixel A and generates a data value B1 based on the arithmetic mean of the data value of the pixel A and the data value of a pixel B on the right hand of the pixel A during horizontal scaling.

The vertical scaler 224 copies a line of the horizontally scaled graphic data. Referring to FIG. 4B, the vertical scaler 224 sets the graphic data values of two pixels corresponding to the pixel A to the graphic data value of the pixel A and sets the graphic data values of two pixels corresponding to the pixel B to the graphic data value of the pixel B. The scaling method illustrated in FIG. 4B is just an example and does not limit the scope of the present invention.

Figure 4C:
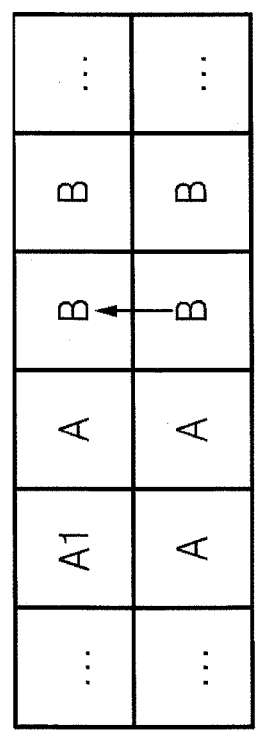

Reference is now made to FIG. 4C, which is a diagram showing that the data value of a pixel at a border of graphic data scaled to two times in the horizontal direction is processed to be the same as the data value of its adjacent pixel. When assuming that the pixel A is video data in FIG. 4B, one pixel among pixels at the border between the video data and the graphic data has a data value B1 that is influenced by the video data. By virtue of the data value B1, the border of the video data and the graphic data may become unclear and/or poorly defined. The data processor 226 sets the data value B1 of the pixel at the border of the video data and the graphic data to the graphic data value of the pixel B adjacent to pixels at the border, thereby allowing the border of the video data and the graphic data to be clear.

Figure 5A:
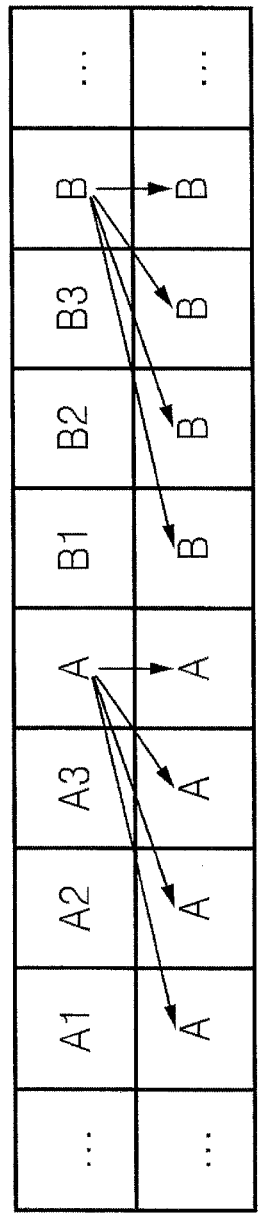
FIG. 5A is a diagram of graphic data scaled to four times in the horizontal direction according to some embodiments of the present invention.

Reference is now made to FIG. 5A, which is a diagram of graphic data scaled to four times in the horizontal direction according to some embodiments of the present invention. The graphic data illustrated in FIG. 5A may be a result of scaling the graphic data illustrated in FIG. 4B to two times. A procedure of scaling graphic data will be described with reference to FIGS. 2 through 4B and FIG. 5A below.

The horizontal scaler 222 may generate a graphic data value A2 based on the graphic data values A1 and A illustrated in FIG. 4B, generate a graphic data value A3 based on the graphic data values A2 and A, generate a graphic data value B2 based on the graphic data values B and B1, and generate a graphic data value B3 based on the graphic data values B2 and B. The vertical scaler 224 copies a line of the horizontally scaled graphic data. Referring to FIG. 5A, the vertical scaler 224 sets the graphic data values of four pixels corresponding to the pixel A to the data value of the pixel A and sets the data value of four pixels corresponding to the pixel B to the data value of the pixel B. Embodiments of the scaling method illustrated in FIG. 5A are merely exemplary and do not limit the scope of the present invention.

Figure 5B:
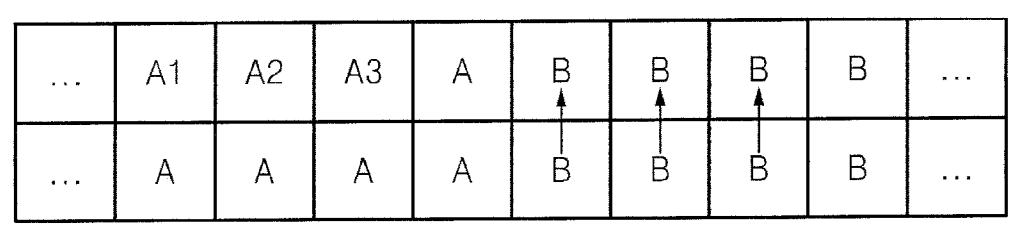

Reference is now made to FIG. 5B, which is a diagram showing that the data value of a pixel at a border of graphic data scaled to four times in the horizontal direction is processed to be the same as the data value of its adjacent pixel. When pixel A is video data in FIG. 5B, pixels at the border of the video data and the graphic data may have the data values B1, B2, and B3 influenced by the video data. Due to such data values B1, B2, and B3, the border of the video data and the graphic data may become unclear and/or poorly defined. The data processor 226 sets the data values B1, B2, and B3 of the pixels at the border of the video data to the graphic data value of the pixel B adjacent to pixels at the border, thereby allowing the border of the video data and the graphic data to be clear.

Reference is now made to FIG. 6, which is a diagram showing compressed graphic data and 4-times scaled-up graphic data. When the compressed graphic data is scaled to four times, the picture quality may be deteriorated. However, since the graphic data is used for UI, the picture quality of which users are less sensitive to relative to video data, the deterioration of the picture quality may be ignored and/or less perceived by a user.

Figure 7:
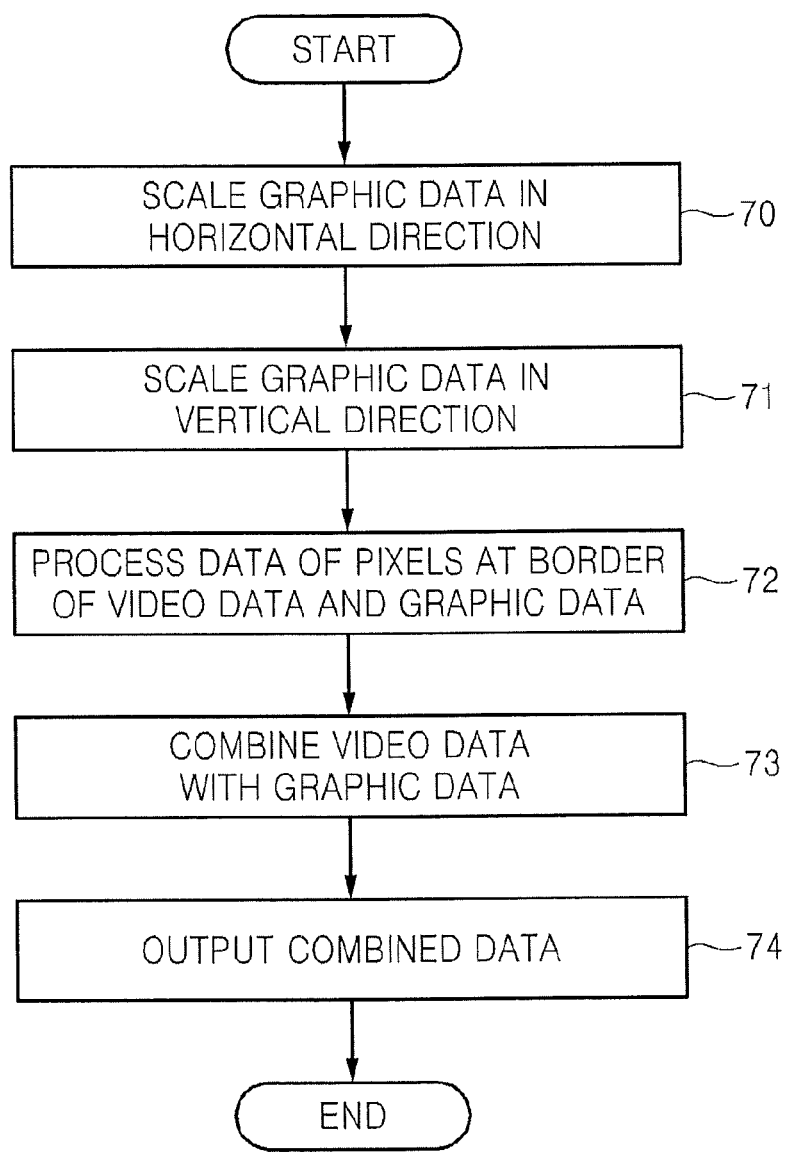
FIG. 7 is a flowchart of an image processing method according to some embodiments of the present invention.

Reference is now made to FIG. 7, which is a flowchart of image processing methods according to some embodiments of the present invention. Referring also to FIG. 2, the horizontal scaler 222 receives compressed graphic data GRAPHIC from the memory 110 and scales the graphic data GRAPHIC in the horizontal direction using bilinear scaling (block 70).

The vertical scaler 224 scales the graphic data GRAPHIC output from the horizontal scaler 222 in the vertical direction using line copy (block 71). The data processor 226 processes the data of pixels at the border of the video data VIDEO and the graphic data GRAPHIC to allow the border between an area in which the video data VIDEO is displayed and an area in which the graphic data GRAPHIC is displayed to be clear (block 72).

The data combiner 230 combines the video data VIDEO output from the memory 110 with the graphic data GRAPHIC output from the scaler 220 (block 73) and outputs combined data (block 74). Although not shown in FIG. 7, some embodiments provide that the data output from the data combiner 230 may be displayed by a display unit.

Image processing methods according to some embodiments of the present invention may be embodied in hardware, software, firmware and/or combination thereof. When the methods are embodied in software, such methods may be embodied as computer readable codes and/or programs on a computer readable recording medium. The computer readable recording medium is any data storage device that can store data which can be thereafter read by a computer system. Examples of the computer readable recording medium may include read-only memory (ROM), random-access memory (RAM), electrically erasable programmable ROM (EEPROM), and/or flash memory, among others.

As described above, according to some embodiments of the present invention, compressed graphic data stored in a memory may be scaled before being displayed, and therefore, the bandwidth of the memory storing the graphic data can be reduced.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. An image processor comprising:
a scaler that is configured to scale compressed graphic data in a horizontal direction, to scale a horizontally scaled graphic data in a vertical direction, and to process a data value of a pixel at a border of a vertically scaled graphic data based on a data value of the compressed graphic data; and
a data combiner that is configured to combine video data with processed graphic data output from the scaler, wherein the scaler configured to scale a coefficient used to combine the video data with the graphic data.

2. The image processor of claim 1, wherein the scaler comprises:
a horizontal scaler that is configured to scale the compressed graphic data in the horizontal direction;
a vertical scaler that is configured to scale the horizontally scaled graphic data in the vertical direction; and
a data processor that is configured to set the data value of the pixel at the border of the vertically scaled graphic data to a graphic data value of a pixel adjacent to the pixel at the border in the graphic data.

3. The image processor of claim 2, wherein the horizontal scaler is configured to scale the compressed graphic and the coefficient using bilinear scaling, and the vertical scaler is configured to scale the horizontally scaled graphic data using line copy.

4. The image processor of claim 3, wherein the horizontal scaler is configured to scale an alpha value area used to combine the video data with the graphic data using the bilinear scaling.

5. The image processor of claim 3, wherein the horizontal scaler is configured to scale a chroma key area used to combine the video data with the graphic data using the bilinear scaling.

6. The image processor of claim 1, wherein the scaler comprises:
a horizontal scaler that is configured to scale the compressed graphic data in the horizontal direction,
wherein the horizontal scaler is configured to scale the compressed graphic and the coefficient using bilinear scaling,
wherein the horizontal scaler is configured to scale an alpha value area used to combine the video data with the graphic data using the bilinear scaling.

7. The image processor of claim 1, wherein the scaler comprises:
a horizontal scaler that is configured to scale the compressed graphic data in the horizontal direction,
wherein the horizontal scaler is configured to scale the compressed graphic and the coefficient using bilinear scaling,
wherein the horizontal scaler is configured to scale a chroma key area used to combine the video data with the graphic data using the bilinear scaling.

8. An electronic device comprising:
an image processor;
a memory that is configured to store the compressed graphic data and the video data and to output the compressed graphic data and the video data to the image processor; and
a display unit that is configured to display image data output from the image processor,
wherein the processor includes:
a scaler that is configured to scale compressed graphic data in a horizontal direction, to scale a horizontally scaled graphic data in a vertical direction, and to process a data value of a pixel at a border of a vertically scaled graphic data based on a data value of the compressed graphic data; and
a data combiner that is configured to combine video data with processed graphic data output from the scaler, wherein the scaler configured to scale a coefficient used to combine the video data with the graphic data.

9. The electronic device of claim 8, wherein the scaler comprises:
a horizontal scaler that is configured to scale the compressed graphic data in the horizontal direction;
a vertical scaler that is configured to scale the horizontally scaled graphic data in the vertical direction; and a data processor that is configured to set the data value of the pixel at the border of the vertically scaled graphic data to a graphic data value of a pixel adjacent to the pixel at the border in the graphic data.

10. The electronic device of claim 9, wherein the horizontal scaler is configured to scale the compressed data and the coefficient using bilinear scaling, and the vertical scaler is configured to scale the horizontally scaled graphic data using line copy.

11. The electronic device of claim 10, wherein the horizontal scaler is configured to scale an alpha value area used to combine the video data with the graphic data using the bilinear scaling.

12. The electronic device of claim 10, wherein the horizontal scaler is configured to scale a chroma key area used to combine the video data with the graphic data using the bilinear scaling.

13. An image processing method comprising:
scaling compressed graphic data in a horizontal direction;
scaling a coefficient used to combine the video data with the graphic data;
scaling a horizontally scaled graphic data in a vertical direction;
processing a data value of a pixel at a border of a vertically scaled graphic data based on a data value of the compressed graphic data; and
combining video data with processed graphic data.

14. The image processing method of claim 13, wherein processing the data value of the pixel comprises setting the data value of the pixel at the border of the vertically scaled graphic data to a graphic data value of a pixel adjacent to the pixel at the border in the graphic data.

15. The image processing method of claim 14, wherein scaling the coefficient used to combine the video data with the graphic data comprises scaling an alpha value area used to combine the video data with the graphic data using the bilinear scaling.

16. The image processing method of claim 14, wherein scaling the coefficient used to combine the video data with the graphic data comprises scaling a chroma key area used to combine the video data with the graphic data using the bilinear scaling.

17. The image processing method of claim 14, scaling the horizontally scaled graphic data in the vertical direction comprises scaling the horizontally scaled graphic data using line copy.

* * * * *